June 8, 1965   R. S. BAKER   3,187,672
ELECTROMAGNETIC PUMP

Filed Jan. 25, 1963   2 Sheets-Sheet 1

INVENTOR.
RICHARD S. BAKER
BY
AGENT

June 8, 1965     R. S. BAKER     3,187,672
ELECTROMAGNETIC PUMP
Filed Jan. 25, 1963     2 Sheets-Sheet 2
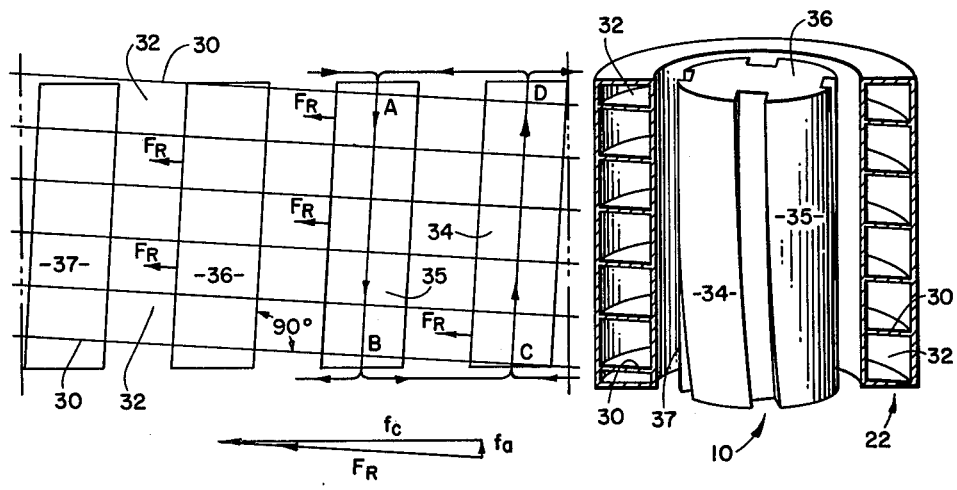
FIG. 4
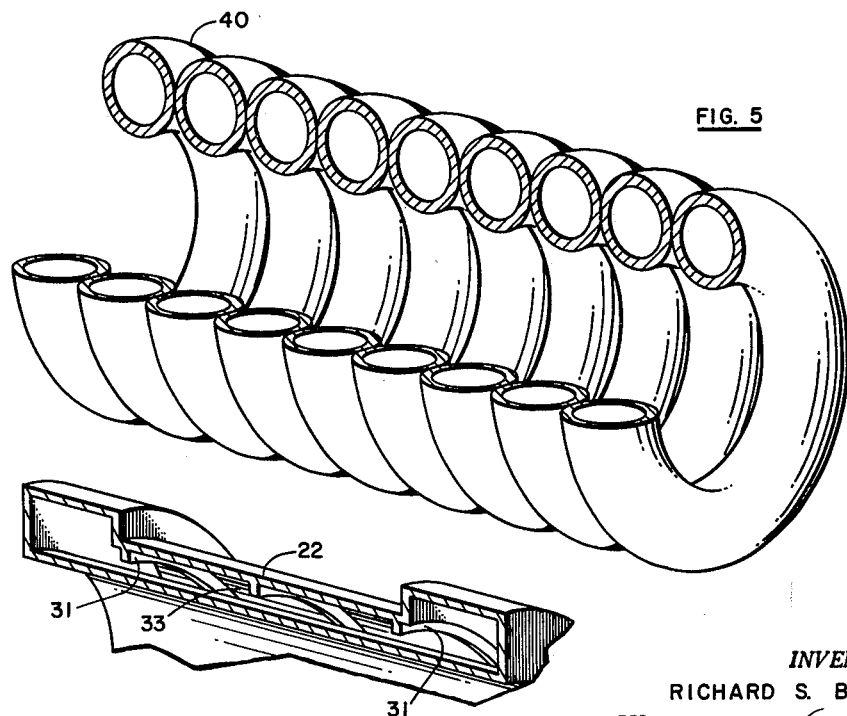
FIG. 5
FIG. 3
INVENTOR.
RICHARD S. BAKER
BY
AGENT

United States Patent Office 3,187,672
Patented June 8, 1965

3,187,672
ELECTROMAGNETIC PUMP
Richard S. Baker, Northridge, Calif., assignor to
North American Aviation, Inc.
Filed Jan. 25, 1963, Ser. No. 253,903
6 Claims. (Cl. 103—1)

The present invention relates to an electromagnetic pump and more particularly to a helical rotor electromagnetic pump having an improved pump region. The present invention is based upon the principle of operation of my helical rotor electromagnetic pump disclosed in Patent No. 2,940,393, issued June 14, 1960, and assigned to the same assignee as the present invention.

Electromagnetic pumps are generally well-known in the prior art as those pumps which convert magnetic energy into pressure energy. Electromagnetic pumps, whether linear induction, conduction, or rotating field, use the electromagnetic thrust that is generated by the passage of an electric current through a conductor transversely to a magnetic field. When the conductor is an electrically conductive liquid, the direction of force acting upon the liquid can be determined by applying the three-finger left-hand rule of electrophysics. Thus, the electrically conductive liquid while passing the current transversely to the magnetic field must also move transversely to the plane defined by the field and the direction of the electric current flow.

Certain design parameters require electromagnetic pumps that can develop a significant increase in pump induced pressure. This increase can be accomplished in my disclosed rotating field helical rotor pump by increasing the number of magnetic poles acting upon the conductive liquid. However, when the number of poles is increased, the diameter of the helical rotor must also be increased to provide adequate circumferential spacing between the adjacent pole surfaces. This spacing is necessary to minimize leakage flux between the adjacent pole surfaces and thereby maintain pump efficiency. While the pump induced pressure can also be increased by extending the axial length of the helical rotor, the number of revolutions or twists of each of the helical rotor poles should also be increased so that each pole can act through an increased distance. Both of these dimensional changes, i.e. increased rotor diameter and length, while increasing the pump induced pressure, are frequently undesirable where design parameters limit the maximum dimensions of the helical rotor pump having the disclosed partitionless pump region.

Accordingly, it is an object of the present invention to provide a new and improved pump region for the helical rotor electromagnetic pump to increase pump induced pressure.

Another object of the invention is to provide a new and improved pump region having a helical geometry that complements the geometry of the pump helical rotor.

A further object of the invention is to provide an improved pump region to increase pump induced pressure while reducing the total number of helical rotor pole surfaces.

Likewise an object of the invention is to provide an improved pump region to increase pump induced pressure without an increase in the helical rotor dimensions.

Yet another object of the invention is to provide an improved pump region having a helical geometry that enables simultaneous pumping of separate conductive liquids.

Further objects, features and the attending advantages of the present invention will become apparent when the following description is read in conjunction with the accompanying drawings in which:

FIGURE 3 is a perspective view, partly broken away, of one modification of the improved pump region of FIGURE 2;

FIGURE 4 is both a perspective view and a developed view of the helical pump rotor shown by FIGURE 1 and the improved pump region shown by FIGURE 2; and FIGURE 5 is a perspective view, partly sectional, of another form of pump region for the pump shown by FIGURE 1.

Briefly, in accordance with one form of the present invention, a helical rotor electromagnetic pump is provided having an improved helical pump region juxtaposed between a rotatable helical rotor and a flux return path so that a magnetic flux field set up by a magnetic means associated with the rotating rotor induces eddy currents which flow in paths in at least one conductive liquid in the pump region that conform with the helical geometry of the rotor and interact with the magnetic field to impart pumping forces on the liquid that conform with the helical geometry of the improved pump region.

Figure 1:
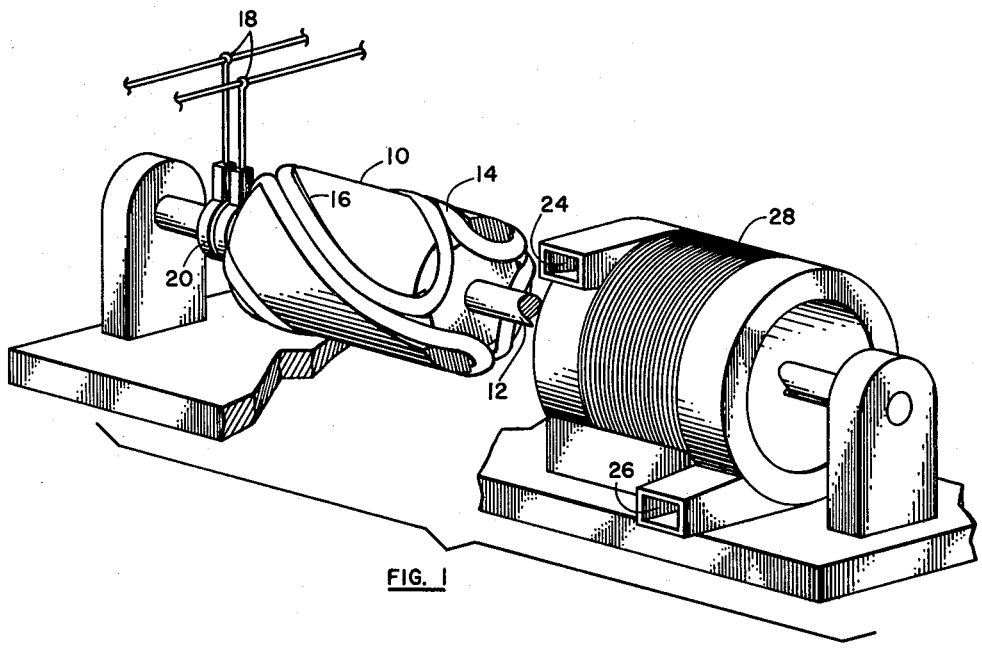
FIGURE 1 is an exploded perspective view of the helical rotor electromagnetic pump of the present invention.

Referring to FIGURE 1, one form of my disclosed helical rotor electromagnetic pump is shown having a helical rotor 10 secured to or integrally formed with a rotor shaft 12 and driven by a suitable prime mover, not shown. A field coil winding 14 is wound in the root of a helical thread 16 on the rotor 10. The field winding 14 is electrically connected to an external direct current power source at 18 by suitable brushes and leads through slip rings 20. The field winding 14 is connected so that adjacent electromagnetic field poles of the helical rotor 10 produce poles of opposite polarity which set up a magnetic flux field about the helical rotor 10 that conforms to the helical geometry of the rotor.

Figure 2:
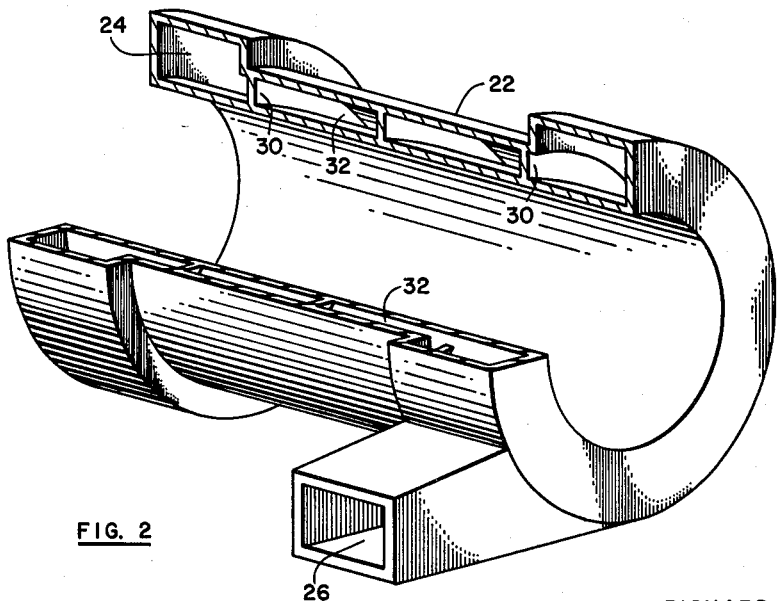
FIGURE 2 is a perspective view, partly sectional, of the improved pump region for the pump of FIGURE 1.

Considering now FIGURES 1 and 2, one form of a new and improved pump region or annulus 22 of the present invention is juxtaposed between and in fluid communication with an inlet region 24 and an outlet region 26. A suitably constructed magnetic structure 28 is arranged circumjacent to the outer wall of the pump region 22 and provides a flux return path for the magnetic flux field to reduce leakage flux.

In one form of the new and improved pump region 22, as shown by FIGURE 2, one or more helical guide vanes, such as helical guide vane 30, are assembled into the pump region. It is contemplated, as shown by FIGURE 3, that pump region 22 can also have one or more helical guide vanes, such as helical guide vane 31. Guide vane 31 extends radially inwardly from the outer wall of the pump region 22 and terminates as shown at a point spaced from the pump region inner wall to define a partial helical flow passage 33.

In FIGURE 2, adjacent turns of the guide vane 30 are spaced apart to define a helical flow passage 32 threading through the pump region 22. The helical flow passage 32 of FIGURE 2 and the partial helical flow passage 33 of FIGURE 3, in accordance with the present invention, are threaded or skewed circumferentially to proceed in a direction opposite to the helical thread 16 of the rotor 10 as shown by FIGURE 1. Thus, when the helical rotor exhibits a right-hand thread, such as helical thread 16, the helical flow passages exhibit a left-hand thread characteristic. When the helical rotor has a left-hand thread, the helical flow passages are arranged in a right-hand thread characteristic. The different thread characteristics of the helical rotor and the improved helical pump region develop increased pump induced pressures without requiring an increase in the helical rotor dimensions. This increase in pump induced pressures is more readily understood by referring to FIGURE 4.

The multiple pole helical rotor 10, as shown by FIGURE 1, is shown in perspective by FIGURE 4 with a partial showing of one form of the new and improved pump region 22 of the present invention, as shown by FIGURE 2, circumjacent to the rotor periphery. The helical rotor 10 is shown as a four-pole helical rotor having magnetic poles 34–37 that can be electromagnetic, permanent magnetic, or a combination thereof. When the four-pole helical rotor 10 and the pump region 22 are developed, i.e. rolled out onto a plane surface, each of the pole surfaces 34–37 intersects the developed helical flow passage 32 at an angle of substantially 90 degrees. Electrical eddy currents are induced in a conductive liquid in pump region 22 along the indicated current paths A–B and C–D as seen by the rotor pole surfaces 34 and 35. The remaining pole surfaces 36 and 37 see a similar relationship of induced eddy currents which flow in paths in the conductive liquid that conform with the geometry of the helical rotor pole surfaces. Applying the three-finger left-hand rule of electrophysics, the direction of electromagnetic thrust or force $F_R$ exerted upon the conductive liquid in the helical flow passage 32 in pump region 22 is perpendicular to the intersecting slope edge of each pole surface and conforms, i.e. is parallel, with the helical flow passage 32 of the improved helical pump region 22.

The vector force $F_R$ is the resultant of an axial vector $f_a$ and a circumferential vector $f_c$. The axial vector $f_a$ imparts a desired velocity to the conductive liquid and moves the conductive liquid axially through the pump region 22.

Prior art rotating field electromagnetic pumps impart a circumferential force $F_c$, not shown, rather than the resultant force $F_R$, as shown by FIGURE 4, since the rotor poles in prior art pumps are not helically arranged. Suitable guide vanes must be positioned in the prior art pump regions at some angle $\theta$ to the force $F_c$ for a pumping action to occur. This circumferential force $F_c$ is then resolved by the guide vanes into a vector component that is perpendicular to the guide vanes and into a vector component that is parallel with the guide vanes. The resulting pumping action in the prior art pumps is due solely to the parallel vector component of $F_c$. However, this parallel component is substantially less than the force $F_c$ since it is the product of $F_c$ and the cosine function of the angle $\theta$ which is less than unity. Since the axial vector $f_a$ is developed initially in my pump, resolution of $F_R$ is not necessary. The angle $\theta$ in my helical rotor pump is therefore zero, and the cosine function unity. This cosine function of unity in my pump enables the development of increased pump induced pressure since work input to the pump is not dissipated. Work input to prior art pumps is dissipated in resolving the circumferential force $F_c$ through the angle $\theta$.

The guide vane 30 in the one embodiment shown by FIGURE 2 develops the helical flow passage 32 that passes circumferentially for several turns about the helical rotor 10 while transversing the axial length of the rotor. In the developed view of FIGURE 4, the several turns of the helical flow passage 32 are super-imposed upon the depeloped pole surfaces 34–37 of the helical rotor 10. The guide vane 30 divides each pole surface into a plurality of adjacent pole segments, each of which act upon the volume of conductive liquid in the portion of the flow passage that is immediately adjacent to the pole segment. Thus, each pole segment develops a resultant force $F_R$ which imparts a pressure to the liquid being pumped. As a particular volume of liquid passes through the several turns of the flow passage 32, each pole segment imparts pressure to the liquid which is additive by accepted vector analysis. This additive effect of each of the resultant forces imparted to the liquid by the adjacent pole segments results in the substantial increase in pump induced pressure.

It is contemplated that the pump induced pressure can be further increased by providing a helical rotor having a greater number of rotor pole surfaces than the pole surfaces 34–37 of helical rotor 10. However, the diameter of such a helical rotor having an increased number of poles should also be increased to minimize leakage flux between the adjacent pole surfaces. If desired, the number of pole surfaces can also be decreased since the helical geometry of the improved pump region 22 of the invention complements the geometry of the helical rotor 10. The geometry of flow passage 32 exposes the conducting liquid being pumped to the resultant forces $F_R$ developed by each pole surface segment, and the additive forces provide a substantial increase in pump induced pressure that is not realized in prior art rotating field electromagnetic pumps such as a helical rotor pump having a partitionless pump region with similar dimensions.

Another form of new and improved pump region is shown by FIGURE 5. When additional strength is required in high pressure pumping, helically wound tubing, such as helical tube 40, replaces the pump region 22 shown by FIGURES 2 and 3, and provides a helical flow passage that is threaded about the helical pump rotor in a manner similar to that previously described. While a singular tube 40 is shown, it is contemplated that the improved pump region of the present invention can be formed from one or more separate helically wound tubes so that separate conductive liquids can be pumped from separate systems. Again, as previously described with regard to FIGURE 4, the developed forces $F_R$ in each turn of the helical tube 40 are additive in accordance with accepted vector analysis to produce a total pump induced pressure substantially higher than that previously obtained by a partitionless pump region having similar dimensions.

As will be evidenced from the foregoing description, certain aspects of the invention are not specifically limited to the particular details of the construction as illustrated. While the source of magnetic flux as shown by FIGURE 1 and schematically shown by FIGURE 4 is a helical rotor with a suitably energized field winding, the magnetic flux can be developed by suitably arranged permanent magnets skewed to form a helical rotor, or by a combination of electromagnets and permanent magnets. A helical permanent magnet rotor as a source of magnetic flux has particular use in small pump configurations for the development of the magnetic forces on the liquid being pumped. It is contemplated that other modifications and applications will occur to those skilled in the art, and it is therefore intended that the appended claims shall cover such modifications and applications that do not depart from the true spirit and scope of my invention.

Having described my invention, what I claim and desire to secure by Letters Patent of the United States is:

1. An electromagnetic pump for pumping electrically conductive liquids comprising:
   (a) a helical rotor means having at least first and second pole surfaces,
   (b) a flux return path means adjacent to said rotor means,
   (c) a pump region juxtaposed between said rotor means and said flux return means,
   (d) at least one helical guide vane in said pump region defining a helical channel skewed circumferentially in a direction opposite to said helical rotor,
   (e) each of said pole surfaces skewed circumferentially to intersect said skewed helical channel at an angle of substantially 90 degrees,
   (f) at least one inlet and one outlet port in said pump region, and
   (g) means associated with said rotor means providing a field source of magnetic flux across said pump region so that rotation of said rotor means induces eddy currents which flow in paths in a conductive liquid in said pump region that conform with the helical geometry of said rotor means and interact with the magnetic flux field to impart resultant pumping forces $F_R$ that are substantially parallel with said helical channel.

2. The pump of claim 1, in which said inlet and outlet ports are substantially normal to said axis of rotation.

3. The pump of claim 1, in which said helical rotor is a field wound electromagnet.

4. An electromagnetic pump for pumping electrically conductive liquids comprising:
   (a) a helical rotor means having a plurality of pole surfaces, each of said pole surfaces having a slope edge,
   (b) a flux return path means adjacent to said rotor means,
   (c) at least one helical tube defining a pump region juxtaposed between said rotor means and said flux return means and wound in a direction opposite to said helical rotor, said helical tube wound substantially perpendicular to the intersecting slope edge of each pole surface,
   (d) at least one inlet and one outlet port in said pump region, and
   (e) means associated with said rotor means to set up a magnetic flux field across said pump region so that rotation of said rotor means induces eddy currents in a conductive liquid in said pump region that conform with the helical geometry of said rotor means and interact with the magnetic field to impart pumping forces $F_R$ that are developed substantially parallel with said helical tube.

5. The pump of claim 4 in which said pump region is formed from multiple helical tubes so that each tube provides a separate flow passage for each conductive liquid being pumped.

6. An electromagnetic pump for pumping electrically conductive liquids comprising:
   (a) a helical rotor means having a plurality of pole surfaces and further having an axis of rotation,
   (b) a flux return path means adjacent said rotor means,
   (c) a helical pump region substantially concentric with said rotor axis of rotation and skewed both circumferentially in a direction opposite to said helical rotor and substantially perpendicular to said helical rotor pole surfaces,
   (d) said helical pump region being juxtaposed between said rotor means and said flux return means,
   (e) at least one inlet and one outlet port in said pump region, and
   (f) magnetic means associated with said rotor means providing a field source of magnetic flux across said pump region so that rotation of said rotor means induces eddy currents which flow in paths in a conductive liquid in said pump region that conform with the helical geometry of said rotor means and interact with the magnetic flux field to impart pumping forces on the liquid that conform with the helical geometry of said pump region and are substantially parallel with said pump region.

References Cited by the Examiner

UNITED STATES PATENTS

| 1,298,664 | 4/19 | Chubb | 103—1 |
| 1,307,210 | 6/19 | Newcomb | 103—1 |
| 2,099,593 | 11/37 | Bender | 103—1 |
| 2,716,943 | 9/55 | Vandenberg | 103—1 |
| 2,847,936 | 8/58 | Richter | 103—1 |
| 2,915,973 | 12/59 | Findlay | 103—1 |
| 2,940,393 | 6/60 | Baker | 103—1 |
| 2,988,000 | 6/61 | Blake | 103—1 |

FOREIGN PATENTS

| 558,624 | 5/23 | France. |
| 823,110 | 11/59 | Great Britain. |

LAURENCE V. EFNER, *Primary Examiner.*